(12) United States Patent
Mohilef et al.

(10) Patent No.: US 10,736,306 B1
(45) Date of Patent: Aug. 11, 2020

(54) HUMMINGBIRD FEEDER WITH UNIQUE INSECT REPELLENT UMBRELLA AND REMOVABLE FLOWER-SHAPED FEEDING PORT MADE OF SILICONE

(71) Applicants: Michelle Mohilef, Chatsworth, CA (US); Danielle Mohilef, Chatsworth, CA (US)

(72) Inventors: Michelle Mohilef, Chatsworth, CA (US); Danielle Mohilef, Chatsworth, CA (US)

( * ) Notice: Subject to any disclaimer, the term of this patent is extended or adjusted under 35 U.S.C. 154(b) by 218 days.

(21) Appl. No.: 16/022,628

(22) Filed: Jun. 28, 2018

Related U.S. Application Data

(60) Provisional application No. 62/526,985, filed on Jun. 29, 2017.

(51) Int. Cl.
*A01K 39/00* (2006.01)
*A01K 39/02* (2006.01)
*A01N 25/04* (2006.01)

(52) U.S. Cl.
CPC .......... *A01K 39/0206* (2013.01); *A01N 25/04* (2013.01)

(58) Field of Classification Search
CPC ...... A01K 39/00; A01K 39/02; A01K 39/024; A01K 39/026; A01K 39/04; A01K 39/0113
USPC ................ 119/72, 74, 77–79, 51.5; 222/650
See application file for complete search history.

(56) References Cited

U.S. PATENT DOCUMENTS

| | | | |
|---|---|---|---|
| 4,691,665 A * | 9/1987 | Hefner | A01K 39/012 119/57.8 |
| D382,376 S | 8/1997 | Bescherer | |
| 8,763,556 B1 | 7/2014 | Vaughn, Jr. | |
| 8,863,691 B2 * | 10/2014 | Colvin | A01K 39/024 119/74 |
| 2013/0284103 A1* | 10/2013 | Colvin | A01K 39/024 119/78 |
| 2015/0020742 A1* | 1/2015 | Faunce | A01K 39/0206 119/78 |
| 2015/0144065 A1* | 5/2015 | Chen | A01K 39/0106 119/51.03 |
| 2016/0374318 A1* | 12/2016 | Colvin | A01K 39/014 119/74 |

* cited by examiner

*Primary Examiner* — Richard T Price, Jr.
(74) *Attorney, Agent, or Firm* — Thomas I. Rozsa

(57) ABSTRACT

A hummingbird feeder having the unique features of an umbrella-shaped member containing insect repellent on a retaining post to repel insects from entering the nectar retaining basin. Also included is a multiplicity of shaped openings that are made of silicone and which are removably affixed to the cover of the nectar retaining basin to facilitate easy cleaning of the shaped openings.

18 Claims, 10 Drawing Sheets

HUMMINGBIRD FEEDER WITH UNIQUE INSECT REPELLENT UMBRELLA AND REMOVABLE FLOWER-SHAPED FEEDING PORT MADE OF SILICONE

CROSS-REFERENCE TO RELATED APPLICATION

This patent application claims priority to Provisional Application Ser. No. 62/526,985 filed on Jun. 29, 2017.

BACKGROUND OF THE INVENTION

1. Field of the Invention

The present invention relates to the field of hummingbird feeders.

2. Description of the Prior Art

The present inventor is aware of U.S. Pat. No. 8,763,556 issued on Jul. 1, 2014 to William R. Vaughn, Jr. for "SOFT PETAL FLOWER PORT FOR HUMMINGBIRD FEEDERS" and United States Design Patent Des. 382,376 issued on Aug. 12, 1997 to Robert E. Bescherer for "HUMMINGBIRD FEEDER". While these prior art patents are related to the field of the present invention, these patents do not disclose or make obvious the unique features of the present invention.

SUMMARY OF THE INVENTION

The present invention is a hummingbird feeder that includes a nectar basin in which nectar is placed, and a basin cover which contains ports through which a hummingbird's beak is inserted to drink the nectar. The present invention also includes a support rail in which the nectar basin is retained and a method by which the entire device is hung from a branch of a tree or outdoor object which enables a hummingbird to gain access to the ports.

The present invention has two very unique features. First, the cover for the nectar retaining feeding basin of prior art hummingbird feeders typically contains a multiplicity of feeding ports with openings to enable the hummingbird's beak to enter and retrieve the nectar retained in the basin. These feeding ports are typically made of plastic and are therefore difficult to clean. One unique feature of the present invention is to have these ports made out of silicone which makes it much easier to remove them and to clean them.

A second key innovation of the present invention is an umbrella on the retaining post which retains insect repellant gel within the umbrella. The insect repellant gel repels insects and prevents them from entering the basin that contains the nectar and polluting the nectar in the basin as well as possibly driving hummingbirds away. The present invention umbrella serves the function of protecting the hummingbird feeder from insects and enables the hummingbirds to feed at the hummingbird feeder unmolested by any insects.

It is therefore an object of the present invention to create a hummingbird feeder with an umbrella on the retaining post, the umbrella being able to retain an insect repellant gel therein to repel insects from coming into the nectar.

It is a further object of the present invention to create a hummingbird feeder wherein the feeding ports are made of silicone and are removable and are easily cleaned and then replaced onto the cover of the nectar retaining basin.

Described in detail, the present invention is a hummingbird feeder comprising:

a. a retaining ring having a multiplicity of attached retaining posts connected to a center nozzle;

b. a nectar retaining basin including a central collar encircling a center opening, the center nozzle extending through the center opening, the nectar retaining basin including an interior chamber, said nectar retaining basin supported by the multiplicity of retaining ring posts;

c. a cover extending over and removably affixed to and enclosing the nectar retaining basin, the cover including a central opening, the nozzle extending through the central opening, the cover having a multiplicity of spaced apart structure openings with each respective structure opening equidistant apart and removably retaining a respective port made of silicone;

d. each respective port made of silicone having an open central area and a multiplicity of channels extending radially outward, each respective channel surrounded by a surface structure in the shape of a flat flower petal, the surface structures in the shape of a flat flower petal joined together to form a shape of a flat flower, the open central region and multiplicity of channels extend through a thickness of the port made of silicone to the interior chamber of the nectar retaining basin;

e. a retaining pole affixed to the center retaining nozzle, the retaining pole including a shaft extending through a central opening in said nozzle, the retaining pole terminating in a hook at its upper end; and f. an umbrella-shaped member removably affixed to said shaft of said pole at a location above said cover of said nectar basin, the removable affixation through a central opening in a top portion, the umbrella-shaped member having an interior chamber which retains insect repellant gel.

Described more broadly, the present invention is a hummingbird feeder comprising:

a. a retaining ring having a multiplicity of attached retaining members, each of the attached retaining member affixed to a base of a central nozzle;

b. a nectar retaining basin including a bottom and sidewall partially surrounding an interior chamber, said nectar retaining basin supported by the multiplicity of retaining members;

c. a cover extending over and removably affixed to and enclosing the nectar retaining basin, the cover having a multiplicity of spaced apart structure openings and removably retaining a respective port made of silicone;

d. each respective port made of silicone having an open central area and a multiplicity of channels extending radially outward, each respective channel surrounded by a surface structure, the surface structures joined together to form a combined structure surrounding the open central area and the multiplicity of channels, the open central region and multiplicity of channels extend through a thickness of the port made of silicone from and upper surface to a bottom surface opening to the interior chamber of the nectar retaining basin;

e. a retaining pole affixed to the center nozzle, the retaining pole including a shaft extending through at least a central opening in said nectar retaining basin and said cover, a hook incorporated into an upper end of the shaft; and f. an upper housing member affixed to the retaining pole, the upper housing member having an interior cavity retaining insect repellant.

Described even more broadly, the present invention is a hummingbird feeder comprising:
a. a retaining member including a multiplicity of affixed retaining posts attached to a central nozzle;
b. a nectar retaining basin including a bottom and sidewall partially surrounding an interior chamber, said nectar retaining basin supported by the retaining member;
c. a cover extending over and removably affixed to and enclosing the nectar retaining basin, the cover having a multiplicity of spaced apart structure openings and removably retaining a respective port;
d. each respective port having an open central area and a multiplicity of channels extending radially outward, each respective channel surrounded by a surface structure, the surface structures joined together to form a combined surface surrounding the open central area and the multiplicity of channels, the open central region and multiplicity of channels extend through a thickness of the port from an upper surface to a bottom surface opening to the interior chamber of the nectar retaining basin;
e. a retaining pole affixed to a portion of the central nozzle, the retaining pole including a shaft extending through at least a central opening in said nectar retaining basin and said cover, a hook incorporated into an upper end of the shaft; and
f. an upper housing member affixed to the retaining pole, the upper housing member retaining insect repellant.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention.

Figure 1:
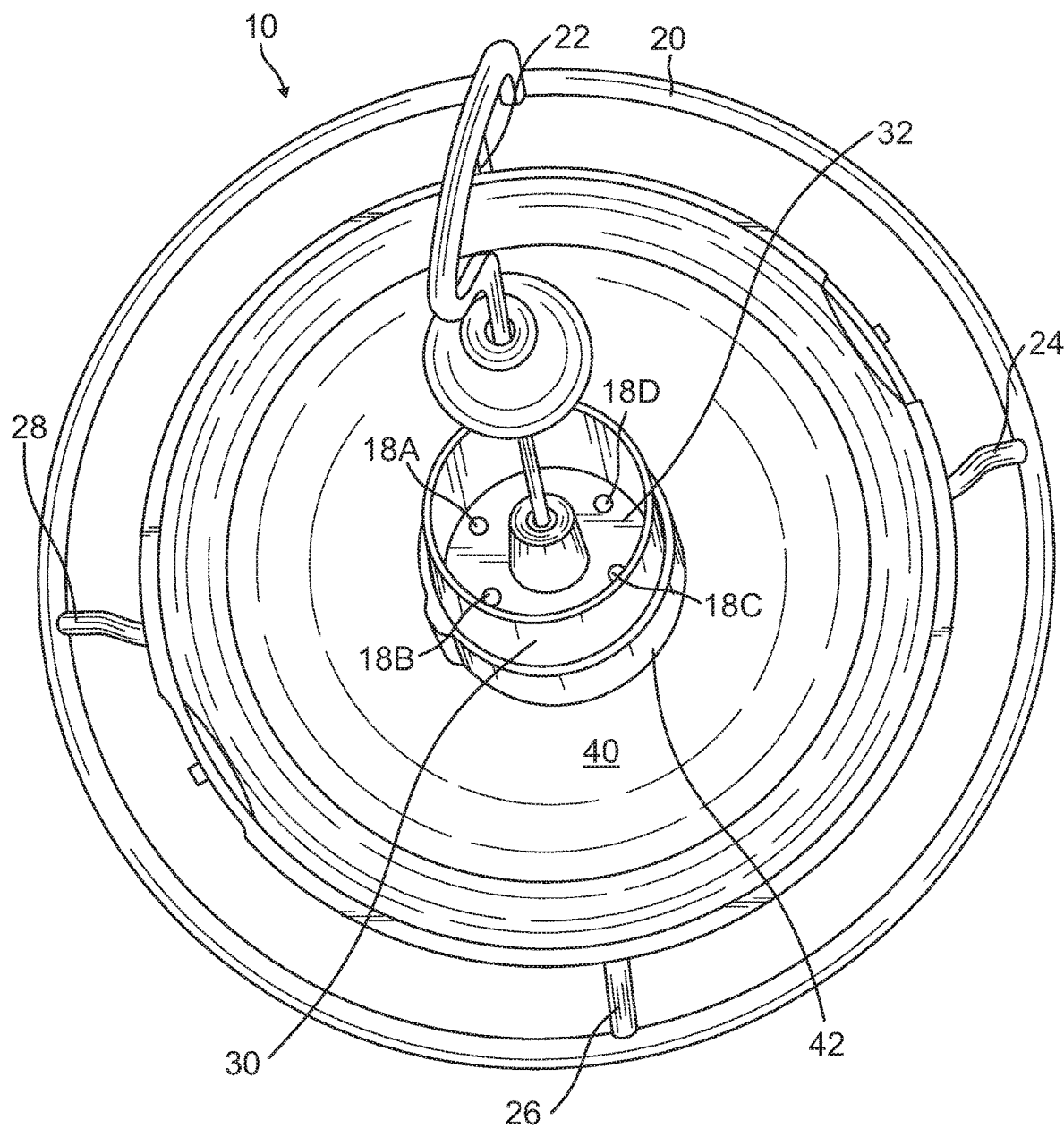
FIG. 1 is a top perspective view of the entire assembly of the hummingbird feeder with the cover removed, including the retaining ring, the hummingbird nectar retaining basin with the cover removed, the central fixture in which the hummingbird basin is retained, the pole including a top hook by which the hummingbird feeder is hung from a branch or other object and the umbrella affixed to the pole, the umbrella-shaped member for retaining insect repellant.

Referring to FIG. 1, there is illustrated a top perspective view of the hummingbird feeder 10 which includes a retaining ring 20 having retaining ring posts 22, 24, 26 and 28 with the retaining rings affixed to a centrally located nozzle or center support nozzle 30 having an interior portion 32 including a multiplicity of openings 18A, 18B, 18C and 18D. Also disclosed is a plastic nectar retaining basin 40 which includes a central collar 42 with an opening 48 through which the nozzle 30 is inserted. The plastic nectar retaining basin 40 is retained by the retaining posts 22, 24, 26, 28 of the retaining ring 20.

Figure 2:
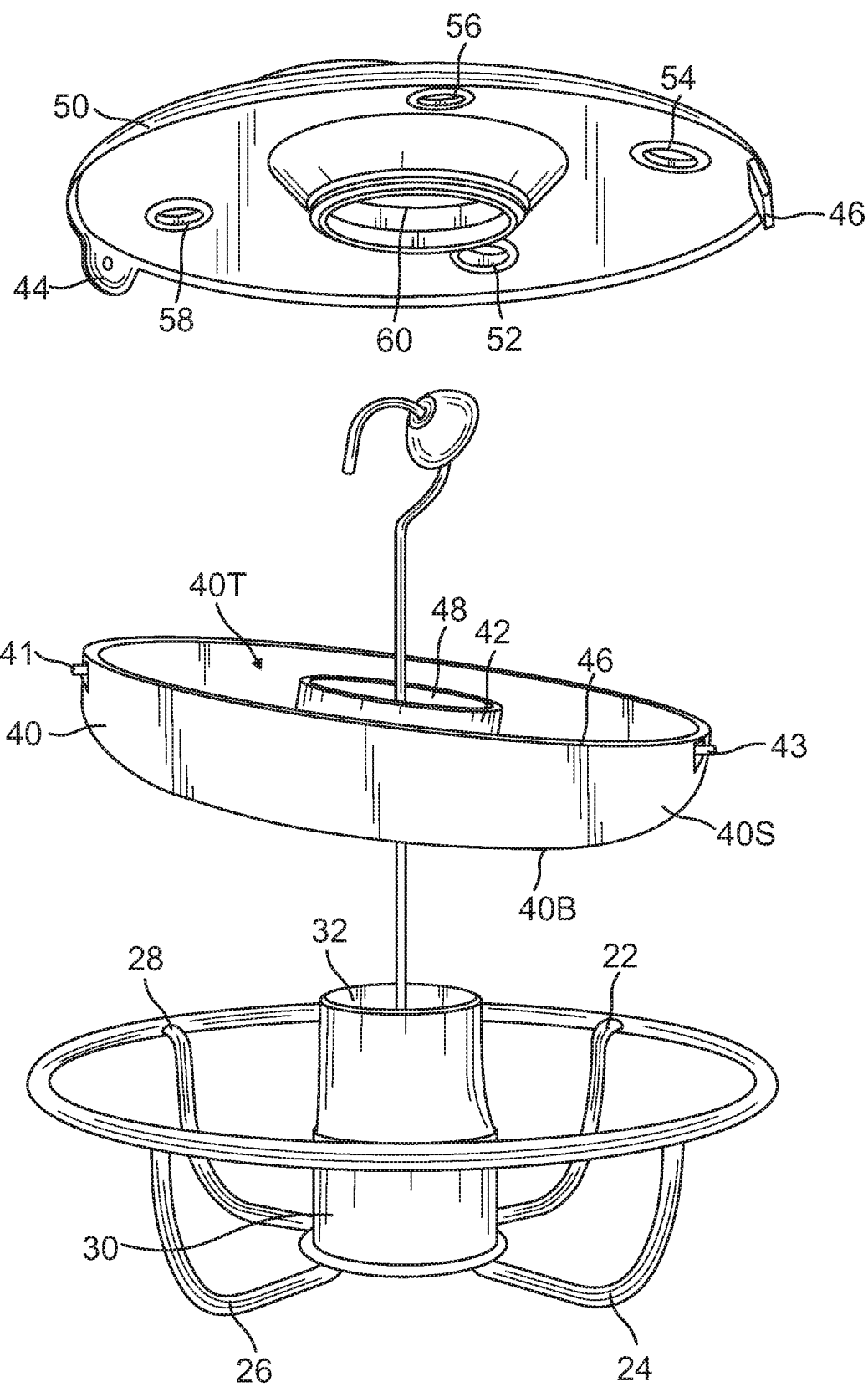
FIG. 2 is an exploded view showing the retaining ring and central nozzle portion, the nectar basin with central openings fitting over the central nozzle portion and fitting into the retaining ring, the metal post that holds the hummingbird feeder to a tree branch, the present invention umbrella-shaped member retained on the metal post, the umbrella-shaped member retaining insect repellant, and the cover for nectar retaining basin.

Referring to FIG. 2, there is illustrated an exploded view of portions of the present invention including the retaining ring 20 having retaining ring posts 22, 24, 26 and 28 affixed at a distal end to the retaining ring and affixed at a proximal end to a center retaining support nozzle 30 having an interior portion 32. Also disclosed is a plastic nectar retaining basin 40 which includes a central collar 42 with an opening 48 through which the nozzle 30 is inserted. The plastic nectar retaining basin 40 is retained by the retaining posts 22, 24, 26, 28 of the retaining ring 20.

Figure 3:
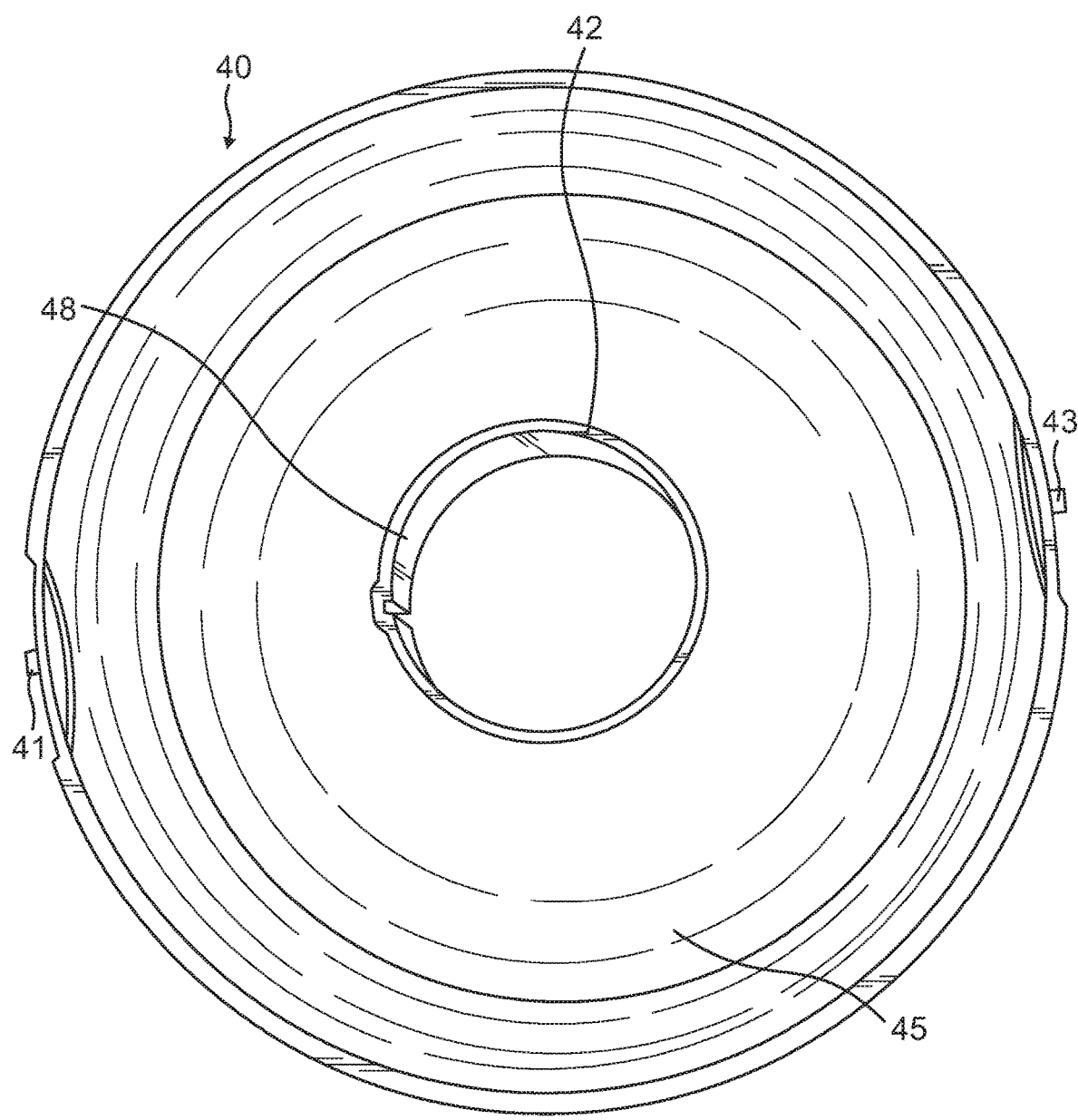
FIG. 3 is top perspective view of the nectar retaining basin.
Figure 4:
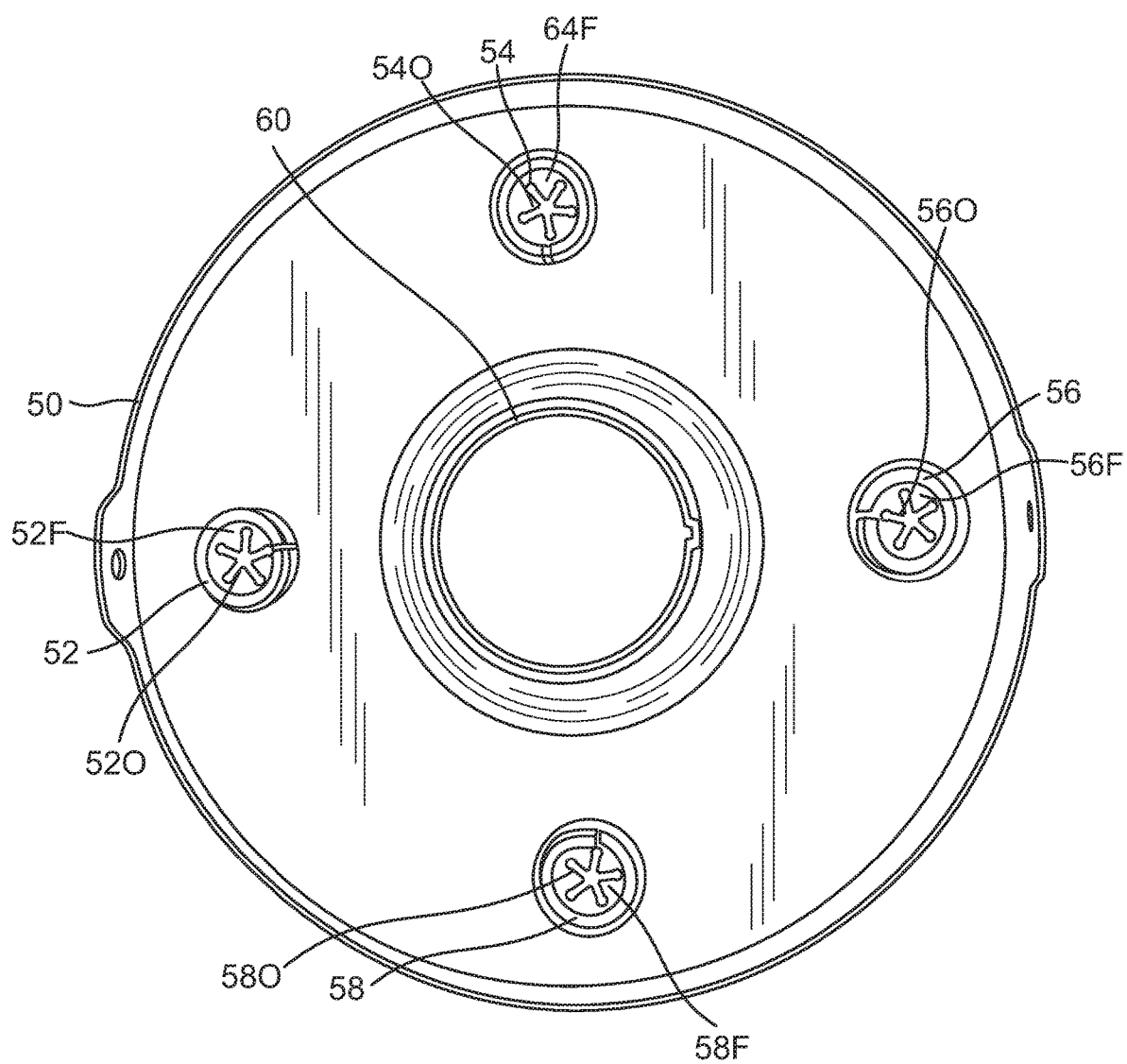
FIG. 4 is a bottom perspective view of the cover for the nectar retaining basin illustrating the feeding ports in the cover which optionally are in the shape of a flower.

Referring to FIG. 3, there is illustrated a top perspective view of the nectar retaining basin 40 and referring to FIG. 4, there is illustrated a bottom plan view of the cover 50 of the nectar retaining basin. A bottom side perspective view of the cover 50 is the uppermost illustration in the exploded view in FIG. 2. Referring to FIGS. 2, 3 and 4, there is illustrated the cover 50 which contains nectar feeding structure openings 52, 54, 56 and 58 (there is a close up view of one of them in FIG. 6). These structure openings each contain a respective removable silicone port 52F, 54F, 56F and 58F. Each respective port has an opening 52O, 54O, 56O and 58O having a shape which enables the hummingbird to gain access to the nectar retaining basin 40.

Figure 6:
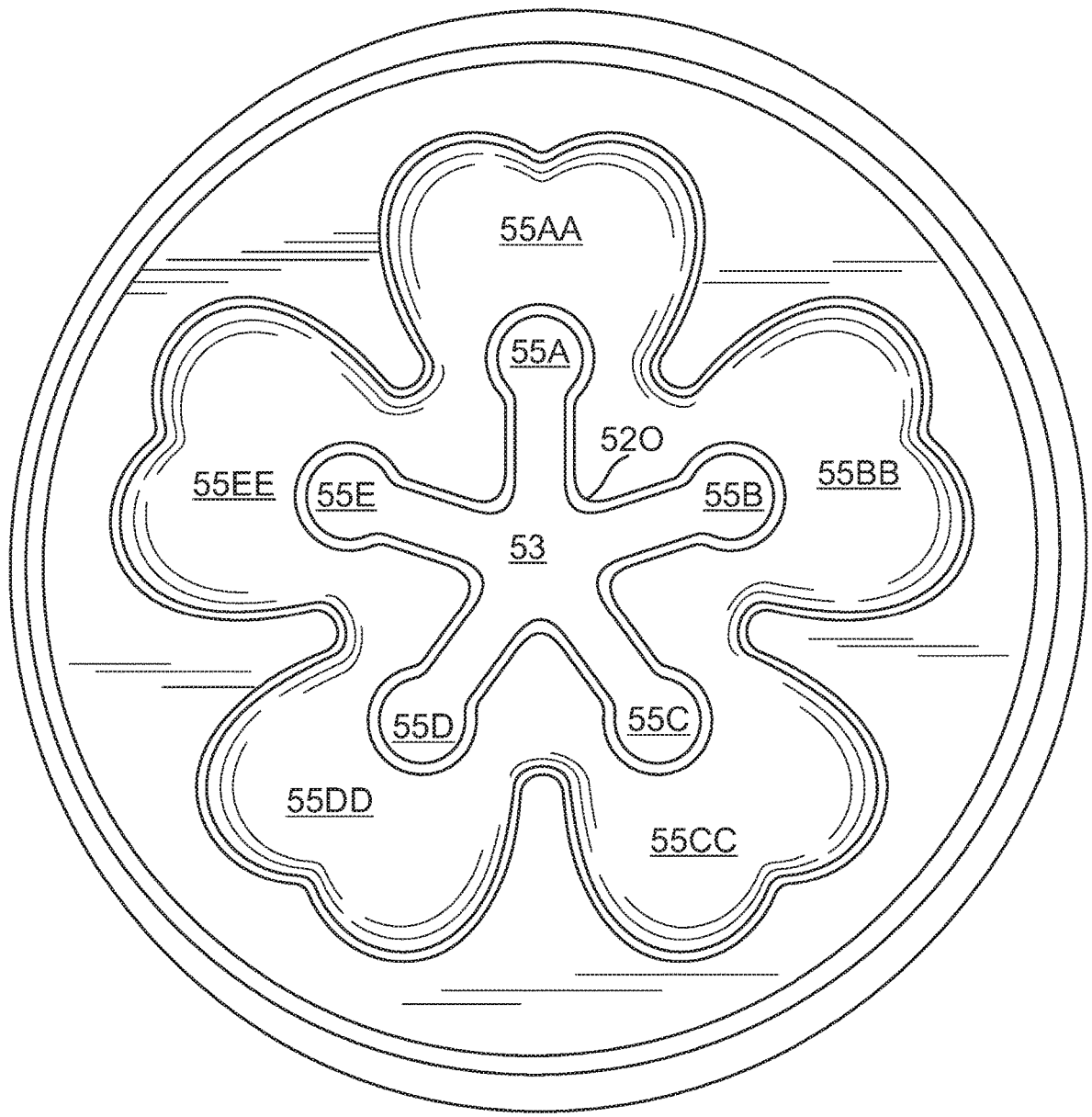
FIG. 6 is a top perspective view of one of the generally flower-shaped nectar feeding port openings.

Referring to FIG. 6, there is illustrated a close-up view of one of the nectar feeding ports. Each of the four port openings, generally described as a nectar feeding structure 52F, 54F, 56F and 58F, has the same shape. The shape of each nectar feeding structure is described as a flower shape. However, described more broadly, each of the nectar feeding structures is described as including an open central region 53 that extends outwardly to form five channels, 55A, 55B, 55C, 55D, and 55E, each respective channel surrounded by a respective surface structure 55AA, 55BB, 55CC, 55DD and 55EE. The five surface structures are joined together to form a clover shape or flower shape. The open central region 53 and channels 55A, 55B, 55C, 55D and 55E extend through the entire thickness of the nectar feeding structure to the interior chamber 46 of the nectar retaining basin 40. It is within the spirit and scope of the present invention for the nectar feeding structure to be any shape as long as it contains a central feeding structure to enable a hummingbird to insert its beak through the opening into the interior chamber 46 of the nectar retaining basin 40.

One of the unique features of the present invention is that each nectar feeding structure 52F, 54F, 56F and 58F is removable and each nectar feeding structure (also called nectar feeding ports) is made of silicone. Conventional feeding ports in hummingbird feeders are made of plastic. However, plastic is difficult to clean. By having this feature of the invention made of silicone, the cleaning is much easier. It will be appreciated that all of the four hummingbird feeder removable ports 52F, 54F, 56F and 58F are the same shape and are all made of silicone as opposed to comparable hummingbird feeder openings being made of plastic.

Figure 10:
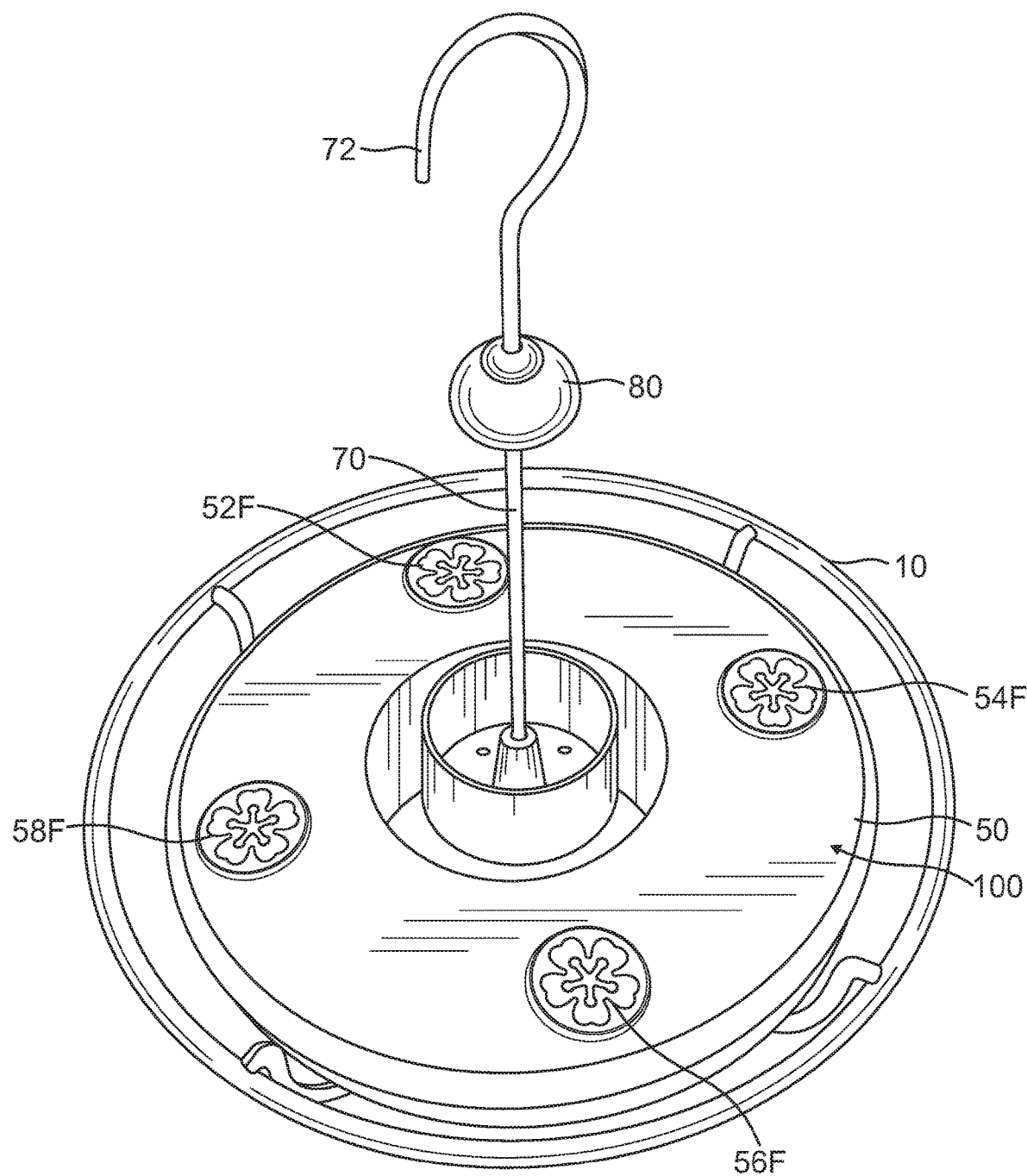
FIG. 10 is a perspective view of the entire present invention hummingbird feeding assembly in the fully assembled condition.

Referring to FIGS. 2, 3 and 4, the cover 50 also has a central opening 60 which is inserted over the centrally located nozzle or center support nozzle 30 and retained by retaining members 44 and 46 which snap fit retain the cover to the nectar retaining basin 40 by mating members 41 and 43. In one embodiment, retaining member 44 has an opening 44A and oppositely disposed retaining member 46 has an opening 46A. Nectar retaining basin 40 has a first retaining member such as a first pin 41 which is inserted into opening 44A and a second retaining member such as a second pin 43 which is inserted into opening 46A. The retaining basin 40 and the cover 50 fit together to form a container 100 as illustrated in FIG. 10. Preferably, the container 100 has an opaque bottom 40B, opaque sidewalls 40S, and a partial open top surface 40T (see FIG. 2).

Figure 5:
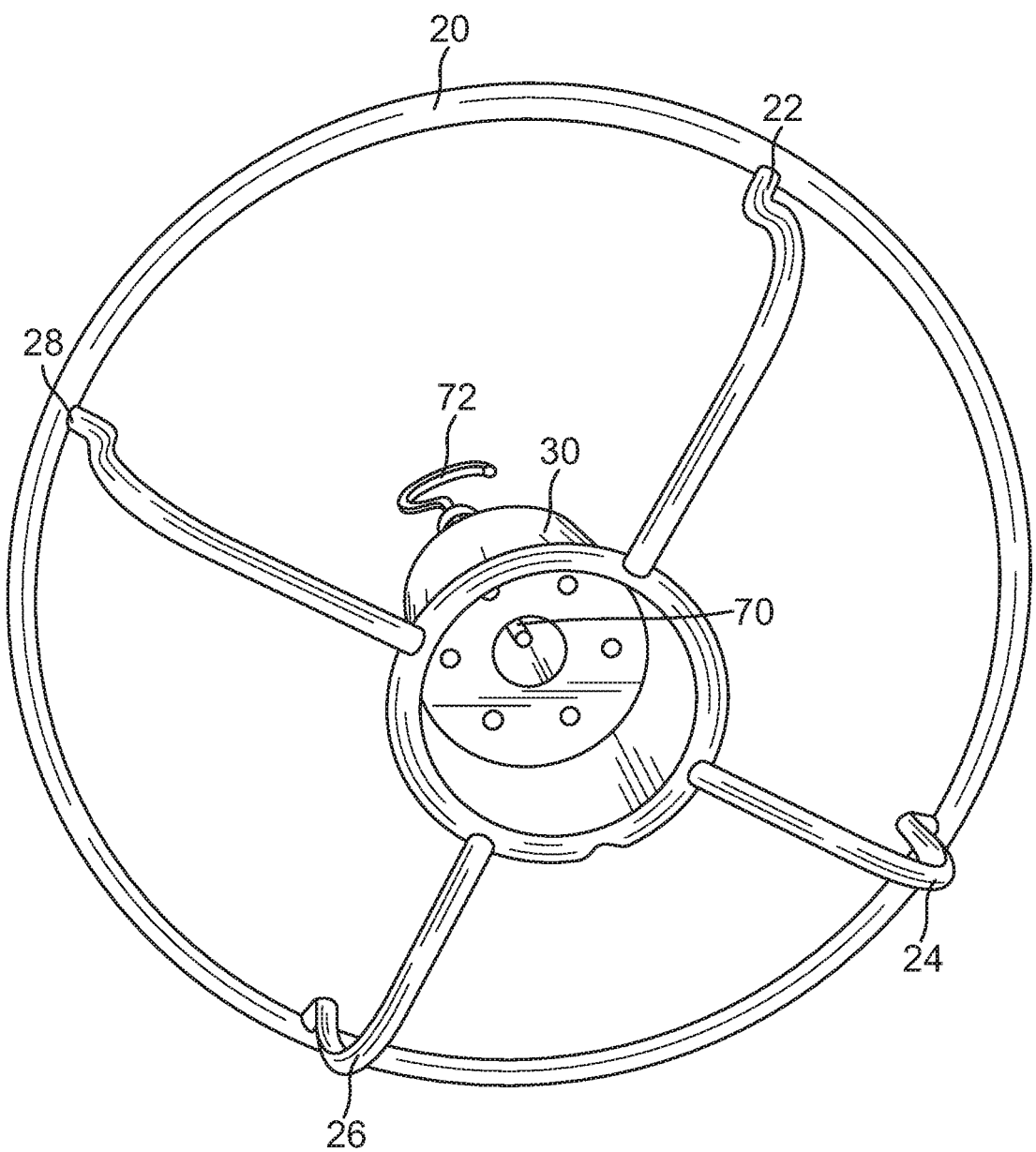
FIG. 5 is a bottom perspective view of the retaining ring, the retaining ring posts and the pole affixed to a central location of the center nozzle.

Referring to FIGS. 1, 2, and 5, the hummingbird feeder includes a retaining pole 70 which is affixed to the retaining ring 20 at a central location where retaining ring posts 22, 24, 26 and 28 come together. The retaining pole is made out of material selected from the group consisting of metal and plastic. The retaining pole 70 includes a shaft 74 which extends through a central opening 31 in nozzle 30, extends through opening 60 of cover 50 and terminates in a hook 72. The hook 72 is placed over an external support structure such as a tree or horizontal member of a pole in order to enable the hummingbird feeder to hang from the tree branch or pole to enable a hummingbird to gain access to the ports. The hook 72 is integral with the shaft 74 or can be a separate piece affixed to the shaft 74.

Figure 8:
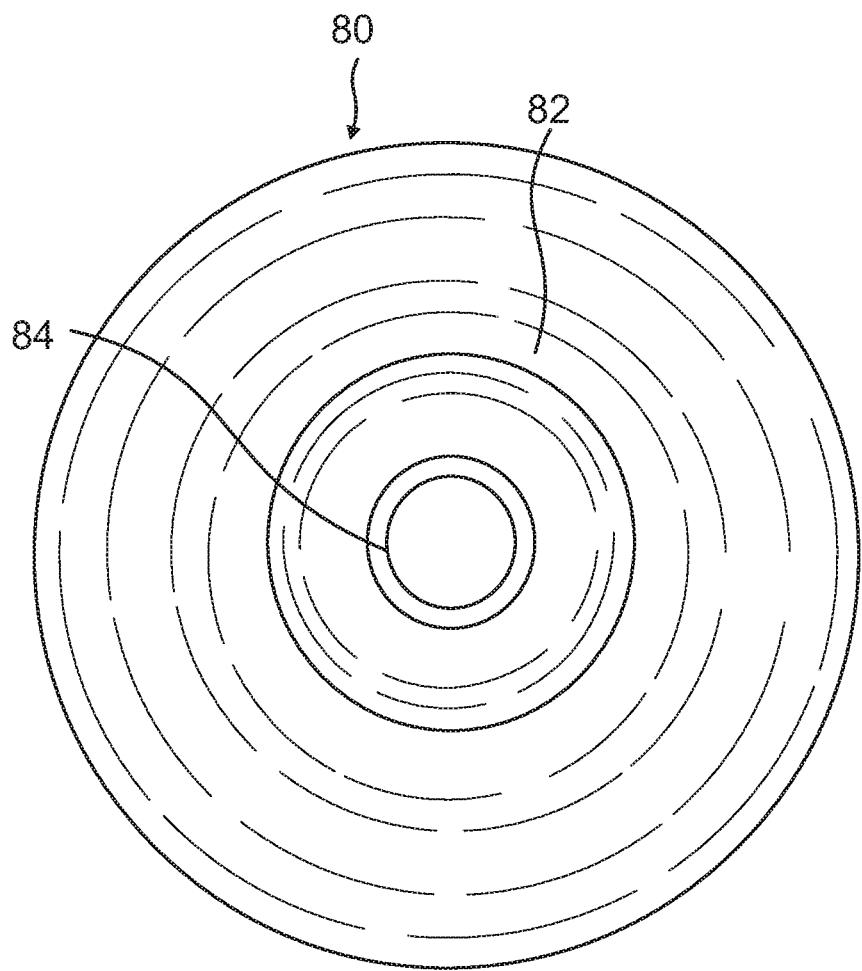
FIG. 8 is a top plan view of the umbrella in which insect repellent is retained.
Figure 9:
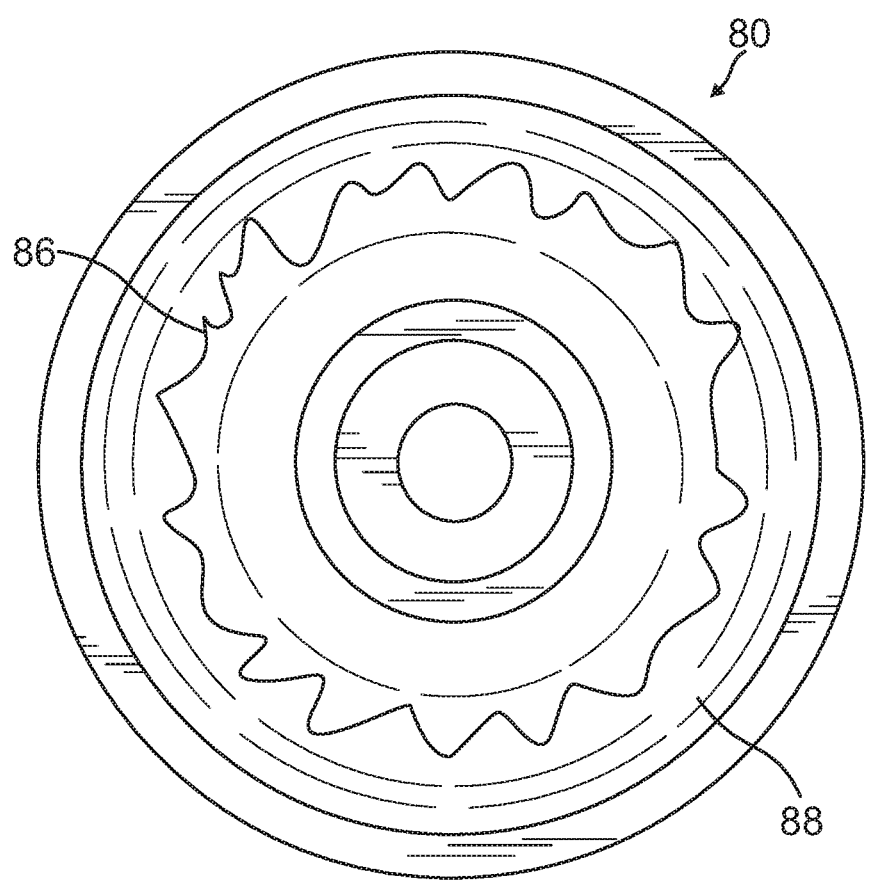
FIG. 9 is a bottom plan view of the umbrella in which insect retaining repellent is retained.

Referring to FIG. 8, there is illustrated a top plan view of the umbrella in which insect repellent is retained. Referring to FIG. 9, there is illustrated a bottom plan view of the umbrella-shaped member in which insect retaining repellent is retained. Referring to FIGS. 1, 2, 8 and 9, there is illustrated a key innovation of the present invention which is an umbrella 80 affixed to the retaining pole 70. The umbrella 80 has a top portion 82 with a umbrella central opening 84 and an interior chamber 88 into which insect repellant gel 86 is placed. With the umbrella in place, insect repelling gel prevents insects from coming into the nectar illustrated as 45 in FIG. 3.

Referring to FIG. 5, there is illustrated a bottom perspective view of the retaining ring with affixed retaining ring posts 22, 24, 26 and 28 which are affixed to the retaining ring at their respective distal ends, the retaining ring posts affixed to a base of the central nozzle 30. The retaining pole 70 is affixed at its base to an interior of the central nozzle 30.

Figure 7:
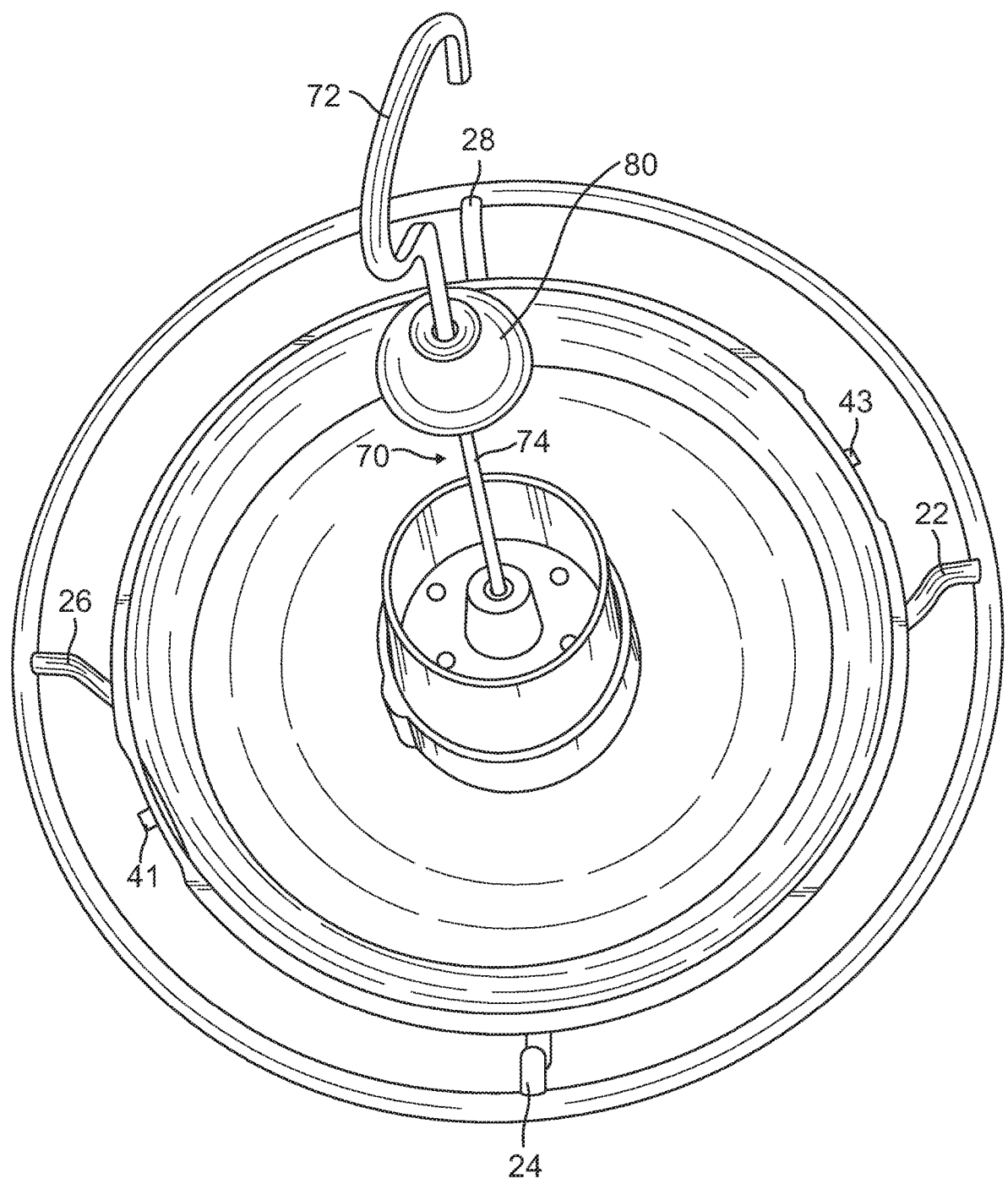
FIG. 7 is a top perspective view of the entire assembly of the hummingbird feeder including the retaining ring, the hummingbird nectar retaining basin with the cover removed, the central fixture in which the hummingbird basin is retained, a pole which is hung from a branch and a more detailed view of the present invention umbrella affixed to the pole where the umbrella retains insect repellent.

Referring to FIG. 7, there is illustrated a top perspective view of the entire assembly of the hummingbird feeder including the retaining ring, the hummingbird nectar retaining basin with the cover removed, the central fixture in which the hummingbird basin is retained, a pole which is hung from a branch; and a more detailed view of the present invention umbrella affixed to the pole where the umbrella retains insect repellent. Referring to FIG. 10, there is illustrated a perspective view of the entire present invention hummingbird feeding assembly in the fully assembled condition. The umbrella-shaped member is removably affixed to shaft 74 of pole 72. It is within the spirit and scope of the present invention for the umbrella to be removably affixed to shaft 74. It is also within the spirit and scope of the present invention for the umbrella-shaped member to be in any functional shape and is more broadly defined as an upper housing member for retaining insect repellant. It will also be appreciated that while insect repellant gel has been described, the insect repellant can be any available insect repellant which can be housed in a semi-viscous manner within the upper housing member. Insect repellant comprises gel, liquid and any viscous member which retains insect repellant.

Therefore, the two key innovations of the present invention are first, that the invention contains the insect repellant retaining umbrella which prevents insects from entering the nectar and second, that the removable feeding port made of silicone which makes it much easier to clean.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A hummingbird feeder comprising:
   a. a retaining ring having a multiplicity of attached retaining posts connected to a center nozzle;
   b. a nectar retaining basin including a central collar encircling a center opening, the center nozzle extending through the center opening, the nectar retaining basin including an interior chamber, said nectar retaining basin supported by the multiplicity of retaining ring posts;
   c. a cover extending over and removably affixed to and enclosing the nectar retaining basin, the cover including a central opening, the nozzle extending through the central opening, the cover having a multiplicity of spaced apart structure openings with each respective structure opening equidistant apart and removably retaining a respective port made of silicone;
   d. each respective port made of silicone having an open central area and a multiplicity of channels extending radially outward, each respective channel surrounded by a surface structure in the shape of a flat flower petal, the surface structures in the shape of a flat flower petal joined together to form a shape of a flat flower, the open central region and multiplicity of channels extend through a thickness of the port made of silicone to the interior chamber of the nectar retaining basin;
   e. a retaining pole affixed to the center retaining nozzle, the retaining pole including a shaft extending through a central opening in said nozzle, the retaining pole terminating in a hook at its upper end; and f. an umbrella-shaped member removably affixed to said shaft of said pole at a location above said cover of said nectar basin, the removable affixation through a central opening in a top portion, the umbrella-shaped member having an interior chamber which retains insect repellant gel.

2. The hummingbird feeder in accordance with claim 1, further comprising: the cover and the nectar retaining basin fit together to form a container having an opaque bottom surface and opaque side walls and partially open top surface.

3. The hummingbird feeder in accordance with claim 1, further comprising: said number of retaining ring posts equal to four (4).

4. The hummingbird feeder in accordance with claim 1, further comprising: the umbrella shaped member is located between the hook and the nozzle.

5. The hummingbird feeder in accordance with claim 1, further comprising: each said respective port made of silicone having a round open central area and said multiplicity of channels are five channels extending radially outward from the round central area to form a shape of a star, each of said respective five channels surrounded by a surface structure in the shape of a flat flower petal, the surface structures in the shape of a flat flower petal joined together to form a shape of a flat five petal flower, the open central region and five channels extend through a thickness of the port made of silicone to the interior chamber of the nectar retaining basin.

6. The hummingbird feeder in accordance with claim 1, further comprising: said retaining pole is made of material selected from the group consisting of metal and plastic.

7. A hummingbird feeder comprising:

a. a retaining ring having a multiplicity of attached retaining members, each of the attached retaining member affixed to a base of a central nozzle;

b. a nectar retaining basin including a bottom and sidewall partially surrounding an interior chamber, said nectar retaining basin supported by the multiplicity of retaining members;

c. a cover extending over and removably affixed to and enclosing the nectar retaining basin, the cover having a multiplicity of spaced apart structure openings and removably retaining a respective port made of silicone;

d. each respective port made of silicone having an open central area and a multiplicity of channels extending radially outward, each respective channel surrounded by a surface structure, the surface structures joined together to form a combined structure surrounding the open central area and the multiplicity of channels, the open central region and multiplicity of channels extend through a thickness of the port made of silicone from and upper surface to a bottom surface opening to the interior chamber of the nectar retaining basin;

e. a retaining pole affixed to the center nozzle, the retaining pole including a shaft extending through at least a central opening in said nectar retaining basin and said cover, a hook incorporated into an upper end of the shaft; and f. an upper housing member affixed to the retaining pole, the upper housing member having an interior cavity retaining insect repellant.

8. The hummingbird feeder in accordance with claim 7, further comprising: the cover and the nectar retaining basin fit together to form a container having an opaque bottom surface and opaque side walls and partially open top surface.

9. The hummingbird feeder in accordance with claim 7, further comprising: said upper housing member is removably affixed to the retaining pole.

10. The hummingbird feeder in accordance with claim 7, further comprising: said upper housing member is an umbrella-shaped member affixed to said shaft of said pole at a location above said cover of said nectar basin, the affixation through a central opening in a top portion, the umbrella-shaped member having an interior chamber which retains insect repellant.

11. The hummingbird feeder in accordance with claim 7, further comprising: each said respective port made of silicone having a round open central area and said multiplicity of channels are five channels extending radially outward from the round central area to form a shape of a star, each of said respective five channels surrounded by a surface structure in the shape of a flat flower petal, the surface structures in the shape of a flat flower petal joined together to form a shape of a flat five petal flower, the open central region and five channels extend through a thickness of the port made of silicone to the interior chamber of the nectar retaining basin.

12. The hummingbird feeder in accordance with claim 7, further comprising: said retaining pole is made of material selected from the group consisting of metal and plastic.

13. A hummingbird feeder comprising:

a. a retaining member including a multiplicity of affixed retaining posts attached to a central nozzle;

b. a nectar retaining basin including a bottom and sidewall partially surrounding an interior chamber, said nectar retaining basin supported by the retaining member;

c. a cover extending over and removably affixed to and enclosing the nectar retaining basin, the cover having a multiplicity of spaced apart structure openings and removably retaining a respective port;

d. each respective port having an open central area and a multiplicity of channels extending radially outward, each respective channel surrounded by a surface structure, the surface structures joined together to form a combined surface surrounding the open central area and the multiplicity of channels, the open central region and multiplicity of channels extend through a thickness of the port from an upper surface to a bottom surface opening to the interior chamber of the nectar retaining basin;

e. a retaining pole affixed to a portion of the central nozzle, the retaining pole including a shaft extending through at least a central opening in said nectar retaining basin and said cover, a hook incorporated into an upper end of the shaft; and f. an upper housing member affixed to the retaining pole, the upper housing member retaining insect repellant.

14. The hummingbird feeder in accordance with claim 13, further comprising: said upper housing member is removably affixed to the retaining pole.

15. The hummingbird feeder in accordance with claim 13, further comprising: said upper housing member is an umbrella-shaped member affixed to said shaft of said pole at a location above said cover of said nectar basin, the affixation through a central opening in a top portion, the umbrella-shaped member having an interior chamber which retains insect repellant.

16. The hummingbird feeder in accordance with claim 13, further comprising: each said respective port made of silicone having a round open central area and said multiplicity of channels are five channels extending radially outward from the round central area to form a shape of a star, each of said respective five channels surrounded by a surface structure in the shape of a flat flower petal, the surface structures in the shape of a flat flower petal joined together to form a shape of a flat five petal flower, the open central region and five channels extend through a thickness of the port made of silicone to the interior chamber of the nectar retaining basin.

17. The hummingbird feeder in accordance with claim 13, further comprising: said retaining pole is made of material selected from the group consisting of metal and plastic.

18. The hummingbird feeder in accordance with claim 13, further comprising: the cover and the basin fit together to form a container having an opaque bottom surface and opaque side walls and partially open top surface.

* * * * *